(12) United States Patent
Nusairat et al.

(10) Patent No.: US 9,253,745 B2
(45) Date of Patent: Feb. 2, 2016

(54) MECHANISM FOR WIRELESS COMMUNICATION

(71) Applicant: Cambium Networks Limited, Devon (GB)

(72) Inventors: Ashraf Nusairat, Hoffman Estates, IL (US); Basman Dahleh, Palos Heights, IL (US)

(73) Assignee: Cambium Networks Limited, Ashburton Devon (GB)

( * ) Notice: Subject to any disclaimer, the term of this patent is extended or adjusted under 35 U.S.C. 154(b) by 29 days.

(21) Appl. No.: 14/046,681

(22) Filed: Oct. 4, 2013

(65) Prior Publication Data

US 2015/0098456 A1 Apr. 9, 2015

(51) Int. Cl.
*H04J 3/00* (2006.01)
*H04W 56/00* (2009.01)

(52) U.S. Cl.
CPC ...... *H04W 56/0015* (2013.01); *H04W 56/0045* (2013.01); *H04W 56/004* (2013.01)

(58) Field of Classification Search
CPC .......... H04W 56/0015; H04W 56/004; H04W 56/0045
See application file for complete search history.

(56) References Cited

U.S. PATENT DOCUMENTS

| | | | | |
|---|---|---|---|---|
| 2007/0230510 A1* | 10/2007 | You et al. | | 370/503 |
| 2008/0130593 A1* | 6/2008 | Scheinert et al. | | 370/337 |
| 2008/0240072 A1* | 10/2008 | Bykovnikov | | 370/350 |
| 2010/0046492 A1* | 2/2010 | Abraham et al. | | 370/342 |
| 2010/0054172 A1* | 3/2010 | Boariu et al. | | 370/315 |
| 2010/0215032 A1* | 8/2010 | Jalloul et al. | | 370/350 |
| 2010/0220694 A1* | 9/2010 | Huang et al. | | 370/336 |
| 2010/0246456 A1* | 9/2010 | Suo et al. | | 370/280 |
| 2010/0284289 A1* | 11/2010 | Suo et al. | | 370/252 |
| 2010/0290372 A1* | 11/2010 | Zhong et al. | | 370/280 |
| 2011/0080896 A1* | 4/2011 | Krishnamurthy et al. | | 370/336 |
| 2013/0301420 A1* | 11/2013 | Zhang et al. | | 370/241 |

OTHER PUBLICATIONS

Combined Search and Examination Report for related application No. GB1405534.7, dated Jul. 23, 2014, 6 p.
The International Search Report and The Written Opinion of the International Searching Authority issued in related PCT Application No. PCT/GB2014/053003 dated Feb. 4, 2015 (10 pages).

* cited by examiner

*Primary Examiner* — Clemence Han
(74) *Attorney, Agent, or Firm* — Brinks Gilson & Lione

(57) ABSTRACT

In a communication system, an access point in communication with one or more stations is configured to shift the start of transmission of its downlink data. The access point may automatically shift the transmission of the downlink data in response to receiving downlink data transmitted by a neighboring access point. Shifting the start of transmission of its downlink data permits stations to correctly synchronize to the downlink data. The transmission of data may be synchronized to a synchronization event. In some instances, the access point updates its downlink data with a value corresponding to the shift. The access point may not shift the transmission of the downlink data if the signal strength of the received downlink data is below a threshold.

15 Claims, 7 Drawing Sheets

MECHANISM FOR WIRELESS COMMUNICATION

BACKGROUND

The present disclosure relates generally to communication systems. The present disclosure relates more particularly to a mechanism for communicating data frames in a time division duplex communication system.

Wireless broadband networks have become very popular for data communication. Such networks may be set up relatively inexpensively and quickly. Such networks may provide local communication among network client devices through an access point which controls communication in the network. Instead, or in addition, such networks may provide communication access to remote networks including the Internet.

The Institute of Electrical and Electronics Engineers (IEEE) has promulgated several data communication standards which have subsequently been adopted by industry. One example of a family of such standards is commonly referred to IEEE 802.11. IEEE 802.11 includes several protocols including IEEE 802.11a, IEEE 802.11b, IEEE 802.11g, IEEE 802.11n and IEEE 802.11ac. 802.11 networks and devices are commonly referred to as WiFi devices. The 802.11 protocols define devices and operations that may communicate in a network, including messaging and timing. According to the protocols, an access point or base station controls data communication including timing of communication between the access point and respective stations or client devices in a service area around the access point. Client devices operate according to the same protocol to communicate with the access point. Messaging is defined by the protocol.

To improve the utility of these networks, manufacturers have been expanding the range of communication and thus the size of the service area. Initially, WiFi communication was limited to line of sight or a few tens of meters between transmitter and receiver. More recently, networks are being developed with a service area radius or node size of 5 to 15 km.

Increasing the scale of networks in this manner has met with commercial success. This success has created opportunities for additional features in systems and methods for communication as well as opportunities for improving performance and efficiency.

BRIEF SUMMARY

This disclosure relates to a synchronized WiFi network such as a network according to the Institute of Electrical and Electronics Engineers (IEEE) 802.11n standard. The network includes a plurality of access points (APs). Each AP provides wireless communication service to stations (STAs) in the vicinity of the AP. In the new network, the cell coverage may be 5 miles in diameter, compared to conventional 802.11n.

In scenarios where the service or coverage area of a plurality of access points overlap and where the plurality of access points communicate with stations via the same range of frequency, a station located in an area of overlap may receive radio signals from more than one access point. In a time division duplex (TDD) system with precise timing, the station receives radio signals transmitted by each of the access points simultaneously. The station synchronizes to the radio signal with the highest signal strength. In a TDD system with imprecise timing, the radio signals may not arrive at the station simultaneously. The station may incorrectly synchronize to the early-arriving radio signals even though the later-arriving radio signals have greater signal strength.

The station may not be able to resynchronize to the later arriving radio signals if the radio signals arrive within a window of time following the early-arriving signals. An access point transmitting the late-arriving radio signals may sufficiently delay the transmission of its radio signals to allow the station to resynchronize to its radio signals.

DETAILED DESCRIPTION OF THE PRESENTLY PREFERRED EMBODIMENTS

In a communication system comprising wireless networks that operate in the same frequency range and have overlapping service areas, apparatuses and methods described herein delay or shift in time the transmission of data in one or more of the wireless networks to mitigate the effects of radio frequency interference caused by other overlapping wireless networks. One benefit of this is improved data throughput and reliability of wireless communications via the wireless communication channel. Delaying the transmission of data by some wireless networks in the communication system may also enable wireless networks to reuse the same range of frequencies even when service areas of wireless networks overlap.

Figure 1:
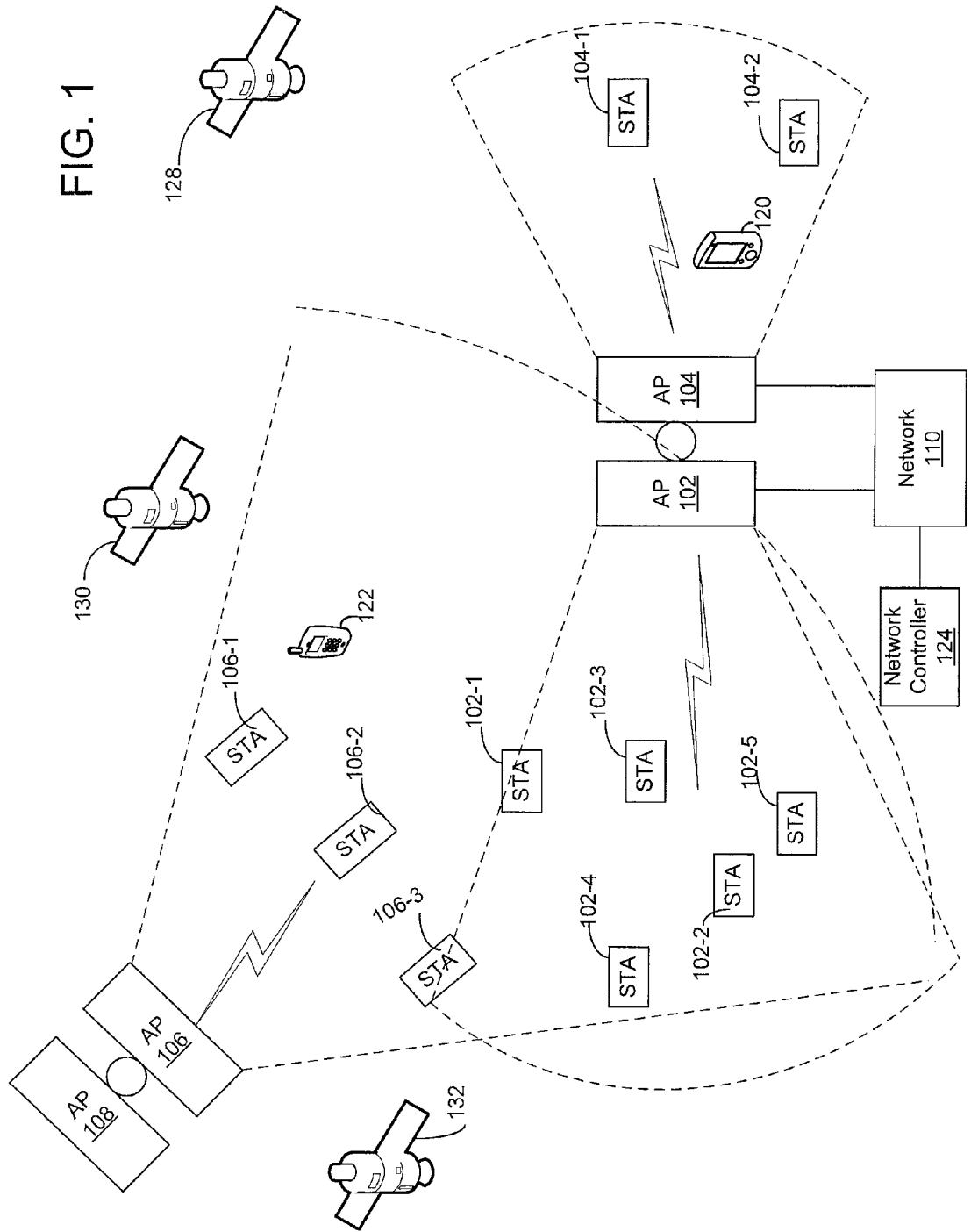
FIG. 1 is a block diagram of an exemplary communication system.

Referring now to the drawings, FIG. 1 is a block diagram of an example communication system 100 that includes wireless devices and networks that may implement a combination of methods described herein to mitigate the effect of radio frequency interference produced by other wireless devices operating in the vicinity of the wireless networks at the same range of frequencies. The communication system 100 is intended to be exemplary only for purposes of illustrating the concepts described herein.

In this exemplary embodiment, the communication system 100 includes a first access point 102, a second access point 104, a third access point 106 and a fourth access point 108. Each respective access point provides radio communication to a service area indicated by the dashed areas surrounding the respective access point. In the illustrated embodiment, each respective access point 102, 104, 106, 108 operates according to the Institute of Electrical and Electronic Engineers (IEEE) standard 802.11n, commonly referred to as WiFi. In other embodiments, one or more of the access points 102, 104, 106, 108 operates according to another wireless standard such as WiMAX or another of the family of 802.11 standards. The devices and techniques described herein may be extended to standards and protocols other than IEEE 802.11n.

In the example of FIG. 1, each respective access point operates as a base station for radio devices within a cell or service area surrounding the access point. In this example, the access point 102 provides radio communication service to one or more stations near the access point. As used herein, radio communication generally refers to the communication of data by the transmission and reception of radio frequency signals representative of the data. Each station (STA) communicates with the access point using a radio communication protocol such as IEEE 802.11n. The radio communication protocol defines frequency allocation, timing, frame structure and other characteristics of the transmission and reception of information between radio devices including the access point and the radio devices. In one embodiment, the radio communication protocol implemented at access points 102, 104, 106 and 108 is configured to allocate the same range of operating frequencies to access points 102, 104, 106 and 108.

In the example of FIG. 1, the access point 102 is in radio communication with five radio devices, including a first station 102-2, a second station 102-2, a third station 102-3, and a fourth station 102-4 and a fifth station 102-5. In this example, the first station 102-1 is designated STA 1, the second station 102-2 is designated STA 2, the third station 102-3 is designated STA 3, the fourth station 102-4 is designated STA 4 and the fifth station 102-5 is designated STA 5. The first station 102-1, second station 102-2, third station 102-3, fourth station 102-4 and fifth station 102-5 may be considered clients of the access point 102 and may be referred to as wireless client devices. An access point such as access point 102 and its corresponding wireless client devices may be referred to as a wireless network. While FIG. 1 shows five stations in radio communication with the access point 102, this is intended to be exemplary only. Any number of stations may communicate with the access point 102. Also, the stations illustrated in FIG. 1 may selectively leave the wireless network and re-enter the network and other stations may enter the wireless network as well. The stations may be mobile and may move in and out of the service area served by the access point 102.

Each of first station 102-1, second station 102-2, third station 102-3, fourth station 102-4 and fifth station 102-5 may include a radio communication circuit in combination with any other suitable device or equipment. Exemplary devices that may include a radio circuit and form a station or wireless client device include a mobile phone, a smart phone, a personal digital assistant (PDA), a laptop computer, a tablet computer, a personal computer and any other data processing device. A radio circuit provides data communication between the data processing device and the access point 102. The radio circuit may be a module or component or group of components and may be a permanent part of the station or may be removable or detachable from the station.

The access point 102 may, in turn, provide data communication between respective stations among the first station 102-1, second station 102-2, third station 102-3, fourth station 102-4 and a fifth station 102-5, or between a respective station and another network 110. The arrangement of access point 102 and stations 102-1, 102-2, 102-3, 102-4 and 102-5 is referred to a point to multi-point (PMP) arrangement or scheme. The network 110 may be any network or combination of networks and may include directly or indirectly the Internet or networks in communication with the Internet.

In the example of FIG. 1, each of the access points 102, 104, 106, 108 is in communication with the network 110. In one embodiment, the operation and configuration of access point 102, 104, 106 and 108 may be controlled by network controller 124. In other embodiments, each of the access points 102, 104, 106, 108 may operate independently with no interaction with adjacent networks and with no overall control or supervision of individual access points. Network controller 124 may correspond to a general purpose computer, in an embodiment. Second access point 104 is in data communication with a STA 120, embodied as a PDA, and stations 104-1 and 104-2. The third access point 106 is in data communication with a STA 122, embodied as a mobile phone and stations 106-1, 106-2 and 106-3. Access point 104 and STA 120, and stations 104-1 and 104-2 comprise a second wireless network and access point 106 and stations 106-1, 106-2, 106-3 and STA 122 constitute a third wireless network.

In some scenarios, the service area surrounding one access point may overlap the service areas of one or more other access points, for example access point 102 and 106 of FIG. 1. The service areas of each access point may be defined by factors such as the configuration and coverage of antennas which communicate radio signals with radios in the service area, the transmit signal strength of each respective radio, and objects in the service area that may cause signal degradation and interference. Although access point 102 and 104 have non-overlapping service areas based on the front to back ratio of the transmitting antenna of access point 104 and access point 102, access point 102 may receive transmissions from access point 104 and vice versa. The front-to-back ratio (also known as front-to-rear ratio) is defined as the ratio of power gain between the front and rear of a directional antenna.

As previously mentioned, in some scenarios, the access points 102, 104, 106 and 108 and their corresponding stations may be configured to communicate via radio frequency channels using the same range of radio frequencies. A station such as station 102-2 may receive radio frequency signals from its access point 102 and access point 106. In some of these scenarios, access point 102 may receive radio frequency signals transmitted by neighboring access point 106 and 104 during a transmission window. A transmission window is a time period when the access points communicate data.

In exemplary embodiments described herein, to prevent station 102-2 from receiving and decoding radio signals transmitted by access point 106 and 104 during a subsequent transmission window, in response to detecting radio frequency signals transmitted by neighboring access points 106 and 104, the transmission of radio signals during a subsequent transmission window by access point 102 may be shifted by a time shift value from a start of the subsequent transmission window. In other exemplary embodiments, access point 102 may be configured to shift the transmission of radio signals in a transmission window by a time shift value. Additional details and alternative embodiments will be described in detail below.

In the example of FIG. 1, the access point 102 and the stations 102-1, 102-2, 102-3, 102-4 and 102-5 may receive and transmit data via a radio frequency communication channel in accordance with a time division duplexing (TDD) scheme. A radio frequency communication channel is a defined frequency or band of frequencies that may be shared by multiple radio devices at designated times. In a TTD scheme, wireless devices are "scheduled" to transmit and receive data via a shared radio frequency channel at preassigned points in time. By scheduling each of the wireless devices to transmit and receive data at different points in time, the radio frequency channel may be shared in an orderly fashion. In one example, an access point such as the access point 102 includes a module referred to as a scheduler which determines scheduling and designation of times for communication by respective radios.

In the PMP arrangement of FIG. 1, a TTD scheme may comprise data communications from access point 102 to stations 102-1, 102-2, 102-3, 102-4 and 102-5 for a period of time and data communication from any of the stations 102-1, 102-2, 102-3, 102-4 and 102-5 to the access point 102 for a subsequent period of time. The channel from the access point 102 to any station in its service area is referred to as the downlink. Data communicated by access point 102 to stations 102-1, 102-2, 102-3, 102-4 and 102-5 is referred to as downlink data. Downlink data is communicated in logical structures called downlink frames and the time period or duration of a downlink frame is referred to as the downlink frame period. In this embodiment, the transmission window discussed above may correspond to the downlink frame.

The channel from any station in the service area of the access point 102 to the access point 102 is referred to as the uplink. Data communicated from the stations 102-1, 102-2, 102-3, 102-4 and 102-5 to the access point 102 is referred to as uplink data. Uplink data is communicated in logical structures called uplink frames and the time period or duration of a downlink frame is referred to as downlink frame period. Generally, the start of downlink data coincides with or is aligned with the start of a downlink frame and the start of uplink data coincides with or is aligned with the start of an uplink data frame. However, in exemplary embodiments described herein, the start of downlink data may be offset or shifted in time from the start of the downlink frame and/or the start of uplink data may be offset or shifted in time from the start of the uplink frame. In the forthcoming discussion, the start of a downlink frame may be referred to as the start of a TDD frame.

Communication between access point 102 and stations 102-1, 102-2, 102-3, 102-4 and 102-5 is accomplished via alternating downlink frames and uplink frames. A downlink frame and an uplink frame together constitute a TDD frame. The time duration of the TDD frame is referred to as a TDD frame duration or period. Wireless networks comprising access points 104, 106 and 108 and the respective stations in data communication with access points 104, 106 and 108 may also operate in accordance with the TDD scheme.

Figure 2:
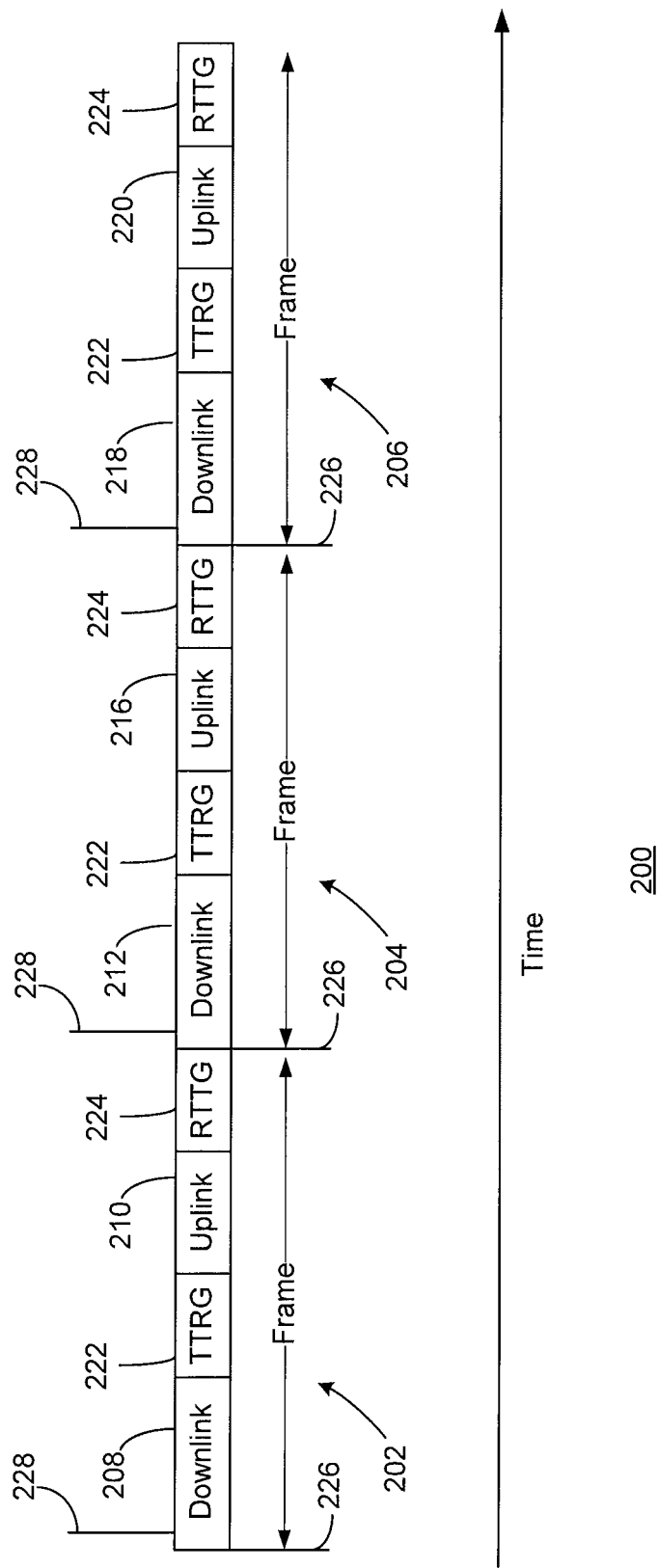
FIG. 2 is a representative diagram of example TDD frames

FIG. 2 is a timing diagram illustrating operation of the communication system 100 of FIG. 1 in accordance with a TDD scheme. FIG. 2 illustrates a sequence 200 of time division duplex (TDD) frames for wireless communication in a communication system using a network protocol such as 802.11. In particular, the sequence 200 of frames has application in extended range networks such as 802.11n networks having a service area diameter greater than a few tens of meters. The sequence 200 may correspond to data communication between an access point and one or more stations in radio communication with the access point.

The sequence 200 of frames includes a first frame 202, a second frame 204 and a third frame 206. In FIG. 2, time is on the horizontal axis. The first frame 202 includes a downlink frame 208 followed in time by an uplink frame 210. Similarly, the second frame 204 includes a downlink frame 212 followed in time by an uplink frame 214. The third frame 206 includes a downlink frame 216 followed in time by an uplink frame 218. A subsequent downlink frame 220 indicates a following frame.

Each respective downlink frame 208, 212, 216, 220 defines a time period when an access point such as the access point 102 (FIG. 1) transmits to stations or client devices in the service area of the access point. Each respective uplink frame 210, 214, 218 defines a time period when stations or client devices in the service area transmit to the access point. The composition and timing of each downlink or uplink is defined by the network protocol.

Each downlink frame and its corresponding uplink frame is separated by transmit to receive gap (TTRG) period 222. Each uplink frame from one frame is separated from the downlink frame of the next frame by receive to transmit gap (RTTG) period 224. The period of a TDD frame 204 for example, comprises a sum of the period of downlink frame 212, the period of uplink frame 216, TTRG period 222 and RTTG period 224. The duty cycle of a frame is defined as the ratio of the period of downlink frame to the period of the frame. The ratio of the period or duration of the downlink frame 208, for example, to the period of TDD frame 202, for example, is referred to as the duty cycle. The period of the downlink frame and the period of uplink frame may be appropriately configured based on the particular application.

Returning to FIG. 1, in a communication system 100 that comprises several wireless networks with overlapping service areas and which operate via radio frequency channels with the same range of frequencies, an access point of a wireless network may synchronize its timing with other wireless networks of the same technology or other technologies operating in the same frequency ranges. To synchronize access points such as access points 102, 104, 106 and 108, the wireless networks must operate in a time division duplex mode in which all access points transmit at the same time for a fixed duration, then switch to a receive mode for a fixed duration. This is done according to the sequence 200 of TDD frames of FIG. 2. During the downlink frames 208, 212, 216, 220, all access points 102, 104, 106, 108 transmit in synchrony. During the uplink frames, all access points 102, 104, 106, 108 receive in synchrony.

To achieve the discussed synchronous operation, in some embodiments, access points 102, 104, 106 and 108 may be configured to receive global position satellite (GPS) signals from GPS satellites 128, 130 and 132. Based on the GPS signals, access points 102, 104, 106 and 108 may generate synchronization events. In an embodiment, transmission of downlink frames by access points and transmission of uplink frames by stations may be configured to occur in response to the generated synchronization events. Because the synchronization events generated by the access points 102, 104, 106 and 108 are based on the same GPS signals, transmission of downlink frames and uplink frames occur in near synchrony.

With reference to FIG. 2, in the context of a TDD scheme, access points may schedule the transmission of TDD frames 202, 206 and 208 in response to receiving a synchronization event corresponding to time 226. In an exemplary embodiment, an access point such as 102 may shift the start of TDD frames 202, 204 and 206 to coincide with time 228. The difference between time 226 and time 228 may correspond to the value of a time shift or time offset applied by access point 102 to the start of a TDD frame. In some embodiments, shifting the start of a TDD frame 204, for example, only involves shifting the start of downlink data with respect to the start of the downlink frame 212 by a time shift value corresponding to the difference between time 226 and time 228. This has the effect of increasing the preceding RTTG period and decreasing the period of the downlink frame. In other embodiments, shifting the start of a TDD frame 204, for example, involves shifting the start of both the downlink data and the uplink data from the start of downlink frame 212 and the start of the uplink frame 216, respectively. This has the effect of increasing the preceding RTTG period and decreasing the period of the downlink frame 212 and increasing the intervening TTRG period and decreasing the period of the uplink frame 216. In still other embodiments, the period of TDD frames 202, 204 and 206 of all access points in the TDD scheme may be increased to account for the shift of TDD frames by any one of the access points.

Figure 3:
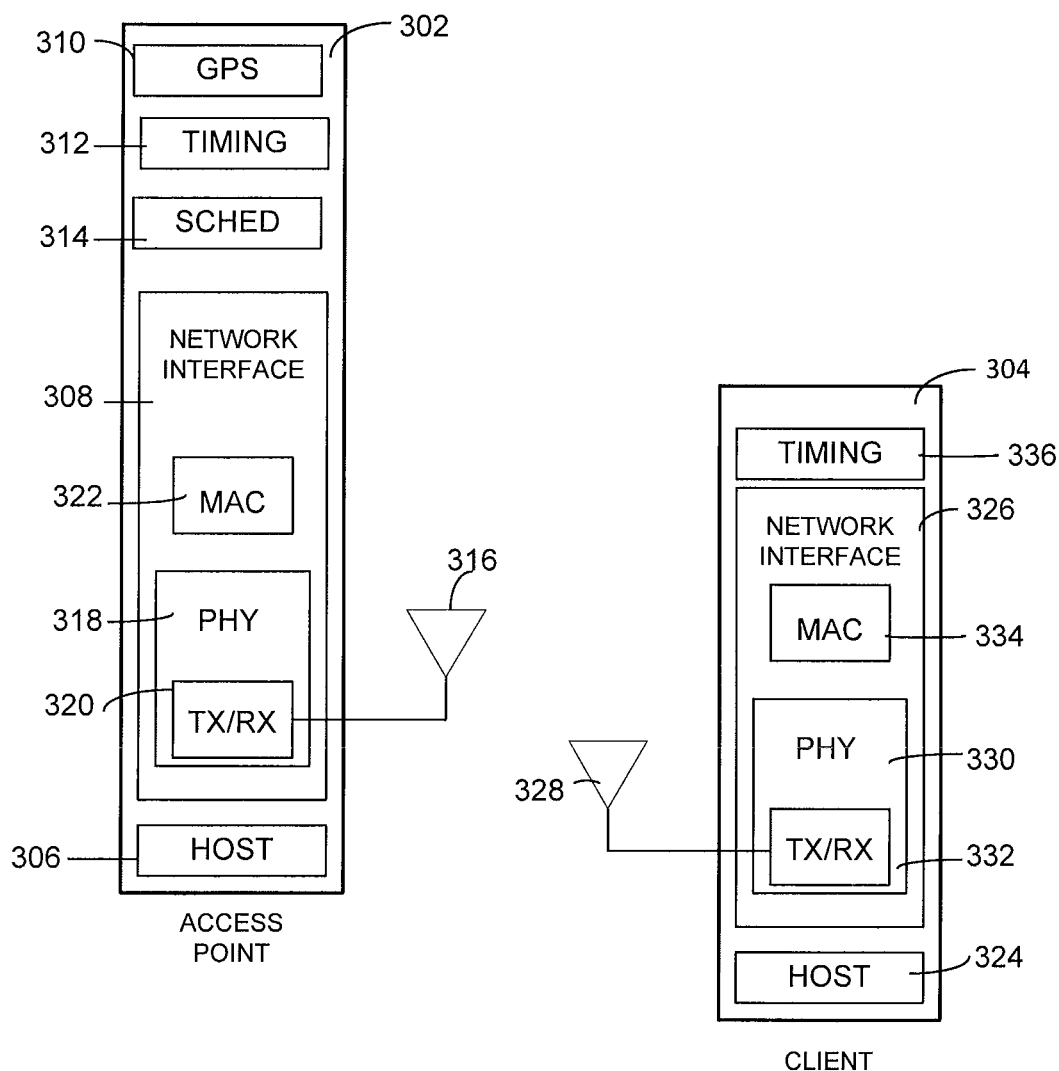
FIG. 3 is a block diagram of a representative access point and representative client device.

FIG. 3 is a block diagram of a representative access point 302 and representative client device 304. The access point 302 may be representative of one of the access points 102, 104, 106, 108 of FIG. 1. Similarly, the client device 304 may be representative of one of the stations 102-1, 102-2, 102-3, 102-4 and 102-5 in FIG. 1. However, the embodiments shown are intended to be exemplary only.

The access point 302 includes a host processor 306, a network interface 308, a global positioning system (GPS) circuit 310, a timing circuit 312, a scheduler 314 and an antenna 316. In other embodiments, the access point 302 may include more or fewer or alternative elements relative to those shown in FIG. 3.

The host processor 306 controls operation of the access point 302. The host processor may include one or more circuits, modules, interfaces or code for implementing control functions. For example, the host processor 306 may include a microprocessor and memory. The memory may store data and instructions for controlling the microprocessor and other components of the access point 302. The microprocessor in turn may operate in response to the stored data and instructions to control operation of the access point.

The network interface 308 controls data communication between the access point 302 and other devices, including the client device 304. The network interface 308 controls wireless communication using the antenna 316. In this regard, the network interface 308 may implement one or more radio circuits to transmit and receive radio communications by means of the antenna 316. The network interface 308 implements a physical layer (PHY) 318 in accordance with the Open Systems Interconnection (OSI) model of computer networking and a transmitter and receiver circuit (TX/RX) 320. In some embodiments the network interface 308 may be implemented in a single commercial semiconductor device or chipset. Examples of such chipsets include Avastar 88W8764 and Atheros AR9002U UB94.

The transmitter portion of TX/RX 320 is adapted to transmit a radio signal representation of the downlink frame of a TDD frame. The transmitter portion of TX/RX 320 may apply the appropriate modulation and coding schemes (MCS) as specified by the 802.11 standard to the uplink frame before transmission. The transmitter portion may also include mixers, frequency synthesizers, digital to analog convertors, power amplifier etc. The receiver portion of TX/RX 320 is configured to receive radio signal representations of uplink frames of TDD frames. The receiver decodes the radio signals to recover the uplink data. The receiver includes amplifiers, automatic gain control circuits, IF amplifiers, demodulators etc. The receiver may also measure characteristics of the received radio signals including the receive power or signal strength, the signal to noise ratio (SNR) of a received radio signal and the carrier interference and noise ratio (CINR). The receive signal strength is frequently referred to as the receive signal strength intensity (RSSI). Further, the network interface 308 implements a media access control layer (MAC) 322 in accordance with the OSI model. The MAC 322 may control the operation of the PHY 318 including configuring the appropriate MCS.

In one embodiment, the network interface 308 implements the IEEE 802.11n protocol, including the 802.11n PHY and MAC layers. The network interface 308 may also or instead implement other data communication protocols for both wireless and wire line communication. For example, the network interface 308 may control communication to other wire line network elements such as network 110 of FIG. 1. In this regard, the network interface may implement protocols such as Ethernet or internet protocol (IP) for communication with other network elements.

The network interface 308 may include data processing circuits such as one or more processors, circuits, interfaces, modules and memory for implementing network control and communication. Moreover, the network interface 308 may include analog circuitry such as amplifiers, oscillators and filters for data communication with the antenna 316.

The antenna 316 may be any suitable device or combination of devices for transmission and reception of signals. In one example, the antenna 316 is a multiple-input, multiple-output (MIMO) antenna array for data communication. In one particular embodiment, the antenna 316 is configured for communication according to the IEEE 802.11 protocol at frequencies such as 2.4 GHz and 3.7 GHz and 5 GHz. Also, the antenna 316 may include multiple structures for communication of other signals such as GSM signals.

The GPS circuit 310 receives GPS signals or other location determination signals such as GLONASS signals. In response to the received location determination signals, the GPS circuit 310 determines geographic location of the access point 302. Also, in response to the received location determination signals, the GPS circuit 310 determines the current time with high precision. The GPS circuit 310 may communicate data about the geographic location of the access point and about the current time to other components of the access point 302, such as the timing circuit 312. The GPS circuit 310 may also generate the previously discussed synchronization event used to synchronize the transmission of TDD frames of access points 102, 104, 106 and 108.

The timing circuit 312 controls timing of the access point 302. The timing circuit 312 may receive current time data and other timing information from the GPS circuit 310. In turn, the timing circuit 312 conveys timing information to other components of the access point 302. The timing information may include data defining the current time, clocking signals, alarm signals and other information. The access point 302 may include suitable means for data communication among its components such as data and control buses by which information such as timing information may be communicated.

The scheduler 314 operates to control timing of transmissions from the access point 302. The scheduler performs functions such as sorting of frames, deciding what frames may be aggregated and timing frame transmissions. In some embodiments, the functions described below may be performed fully or in part by other components of the access point 302.

In one exemplary embodiment, the scheduler 314 is configured to shift the time of transmission of uplink and downlink frames. In another exemplary embodiment, the scheduler 314 causes the network interface to scan the radio frequency communication channel periodically and/or when access point 302 is first powered up. Scanning the radio frequency communication channel may comprise configuring the receiver of TX/RX 320 of network interface 308 to operate to receive all downlink transmissions that occur during a TDD frame period such as frame 202 illustrated in FIG. 1, for example. Thus, access point 302 may receive downlink frames transmitted by neighboring access points.

In a TTD scheme, when access point 302 is first powered up, scheduler 314 may be configured to scan the radio frequency communication channel for a pre-determined period of time. Scheduler 314 may scan the radio frequency communication channel for the pre-determined period of time in response to receiving a synchronization event from GPS circuit 310. In an embodiment, the pre-determined period of time may correspond to the time period of a TDD frame. At the end of a TDD frame period, scheduler 314 may analyze any received downlink frames transmitted by neighboring access points. As will be discussed in detail later, downlink data in received downlink frames transmitted by neighboring access points may indicate if the transmitted downlink data is shifted from the synchronization event and the value of the shift. In this exemplary embodiment, scheduler 314 may conditionally shift the start of its downlink data from a subsequent synchronization event based on the shift of the TDD frames transmitted by the neighboring access points as determined from the data in the received downlink frames. In this embodiment, downlink frames generated by scheduler 314 may indicate the value of the shift of the start of its own TDD frame.

As previously discussed, receiver of TX/RX 320 may measure the signal strength of the received radio signals that correspond to downlink frames transmitted by neighboring access points. In some embodiments, scheduler 314 may determine that the signal strength of the received radio signals is below the threshold that would cause one of its client wireless devices to erroneously synchronize to the downlink frames transmitted by the neighboring access point. In response scheduler 314 may not shift the transmission of its TDD frame.

The scheduler 314 may include any suitable combination of circuits, processors, interfaces, memory or code for performing the necessary functions. In the example of FIG. 3, the schedule 314 is a separate component of the access point 202. In some embodiments, however, the scheduler 314 may be implemented by other components such as the network interface 308 or the host processor 306.

The client device 304 includes a host processor 324, a network interface 326, an antenna 328 and a timing circuit 336. In other embodiments, the client device 304 may include other components providing other functionality. For example, in embodiments where the client device 304 is a mobile phone, the client device 304 includes a call processor circuit, a user interface and possibly other components such as a camera and accelerometers. In embodiments where the client device 304 is a portable computer, the client device 304 may include a keyboard, a display and a hard disk drive or other mass storage. In some embodiments, the client device 204 may be a module within a host device such as the portable computer or mobile phone.

The host processor 324 controls operation of the client device 204. The host processor 324 may include one or more circuits, modules, interfaces or code for implementing control functions. For example, the host processor 324 may include a microprocessor and memory. The memory may store data and instructions for controlling the microprocessor. The microprocessor in turn may operate in response to the stored data and instructions to control operation of the client device 304.

The network interface 326 controls data communication between the client device 304 and other devices, including the access point 302. The network interface 326 controls wireless communication using the antenna 328. In this regard, the network interface 326 may implement one or more radio circuits to transmit and receive radio communications by means of the antenna 328. In the illustrated embodiment, the network interface 326 implements a physical layer (PHY) 330 as well as a transmitter and receiver circuit (TX/RX) 332. Further, the network interface 326 implements a media access control layer (MAC) 334 in accordance with the OSI model. The network interface 326 forms a radio circuit for radio communication with a remote access point or other radio device.

The transmitter and receiver circuit (TX/RX) 332 is configured to synchronize its operation to a downlink frame received from an access point. In a scenario, such as the one illustrated in FIG. 1, where client device 304 is located in a region where the service areas of two or more access points overlap, a client device 304 may receive downlink data frames from two or more access points. In this scenario, transmitter and receiver circuit (TX/RX) 332 may synchronize to the downlink frame which is received at a stronger signal strength or level.

In one embodiment, the network interface 326 implements the IEEE 802.11n protocol, including the 802.11n PHY layer 330 and MAC layer 334. In this regard, the client device 304 forms or is a part of an 802.11 station or STA. The network interface 326 may also or instead implement other data communication protocols for both wireless and wire line communication. For example, the network interface 326 may control communication to other components of the client device 304.

The network interface 326 may include data processing circuits such as one or more processors, circuits, interfaces, modules and memory for implementing network control and communication. Moreover, the network interface 326 may include analog circuitry such as amplifiers, oscillators and filters for communication with the antenna 328.

The antenna 328 may be any suitable device or combination of devices for transmission and reception of signals. In one example, the antenna 328 is a multiple-input, multiple-output (MIMO) antenna array for data communication. In one particular embodiment, the antenna 328 is configured for communication according to the IEEE 802.11 protocol at frequencies such as 2.4 GHz and 3.7 GHz and 5 GHz. Also, the antenna 328 may include multiple structures for communication of other signals such as GSM signals.

The timing circuit 336 maintains timing and synchronization information for the client device 304. In one example, the client device receives timing or synchronization information periodically from the access point 302. This information may come in the form of a beacon signal transmitted by the access point 302. By synchronizing the timing information transmitted in the beacons to the periodic synchronization event, the local times of the stations may be synchronized to the periodic synchronization event. In other embodiments, an access point may transmit other periodic transmissions to allow receiving stations to synchronize their local times. The stations may accordingly schedule the start of their respective portions of uplink frames at appropriate times during the uplink frame. As previously discussed, the stations may shift the shift the start of their respective portions of uplink frames, in some embodiments.

In operation, the access point 302 and client device 304 are in selective wireless data communication. The access point 302 operates as a base station and provides data communication in a service area adjacent to the access point 302 to client devices or stations such as the client device 304. Data communication is conducted according to a protocol such as IEEE 802.11. The access point 302 operates as a host or server to client devices such as the client device 304 in the service area and establishes a communication network for the stations in the service area.

Returning to FIG. 1, stations 102-1, 102-2, 102-3, 102-4 and 102-5 may receive downlink frames from both access points 102 and 106. Separately, one or more stations 102-1, 102-2, 102-3, 102-4 and 102-5 may receive reflected signals from access point 104. In scenarios where a station 102-2 for example, receives downlink frames from access points 102 and 106 simultaneously or in synchrony, receiver circuitry in station 102-2 will cause station 102-2 to synchronize to the strongest signal. Assuming that the signal strength of downlink frame transmissions from access point 102 is greater than the signal strength of downlink frame transmission from access point 106 and that the downlink frame transmissions from access point 102 and 106 arrive at station 102-2 simultaneously, station 102-2 will synchronize to downlink frame transmitted by access point 102. If however downlink frame transmitted by access point 106 is received within a small window of time before downlink frame transmitted by access point 102, station 102-2 may erroneously synchronize to the downlink frame transmitted by access point 106. The small window of time corresponds to the time taken by a station to decode an initial portion of a received downlink frame. The start of a downlink frame arriving during this time period cannot be detected by the station. The time period of this small window of time is on the order of a few microseconds.

To prevent a station such as station 102-2 from unintentionally synchronizing to a downlink frame transmitted by an access point, such as access point 106, in one scenario access point 102 may be configured to delay or shift the start of transmission of its downlink frame by a time period that is greater than the small window of time that causes station 102-2 to erroneously synchronize to access point 106. In this scenario, receiver circuitry in a station 102-2 may resynchronize to the stronger signal corresponding to the downlink frame transmitted by access point 102, if the downlink frame transmitted by access point 102 is shifted by period greater than the small window of time.

Figure 4:
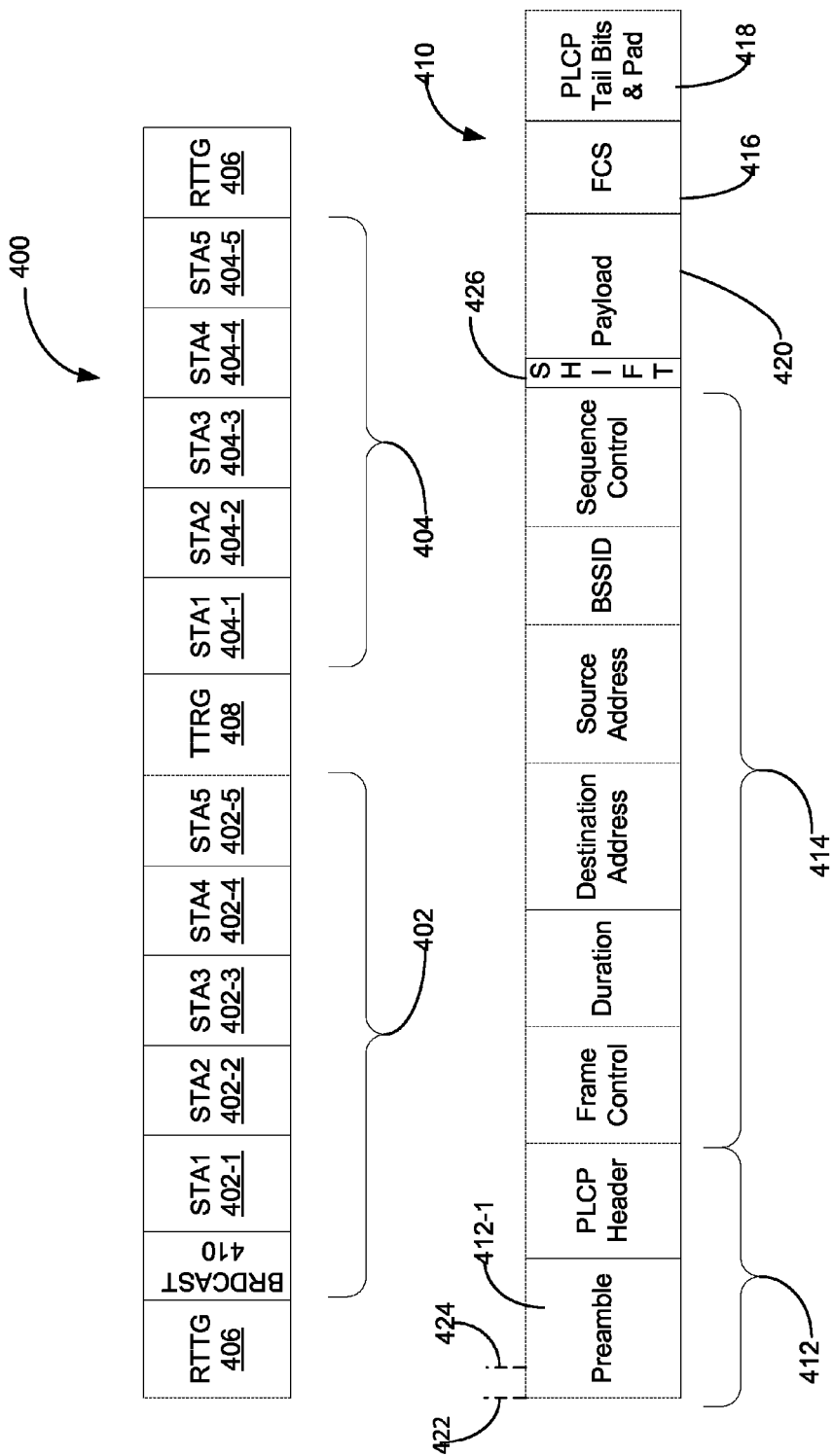
FIG. 4 illustrates a format of the TDD frames that may be used for communication in the communication system of FIG. 1.

FIG. 4 is a detailed view of an example TDD frame 400 that may be communicated between wireless devices in previously described wireless networks. TDD frame 400 may correspond to the TDD frames 202, 204 and 206 of FIG. 2. TDD frame 400 comprises downlink frame 402, uplink frame 404, RTTG 406 and TTRG 408. As previously discussed downlink frame 402 and uplink frame 404 are the logical structures that encapsulate or demarcate downlink data and uplink data respectively. In this example, downlink data communicated in downlink frame 402 includes broadcast data 410, and downlink data portions or slots 402-1, 402-2, 402-3, 402-4 and 402-5. An access point communicates data to respective wireless client devices during corresponding downlink data portions or slots. With reference to FIG. 1, downlink data portion 402-1 may correspond to data communicated by access point 102 to station 102-1. Similarly, downlink data portion 402-2, 402-3, 402-4 and 402-5 may correspond to data communicated by access point 102 to stations 102-2, 102-3, 102-4 and 102-5 respectively. By way of example and without limitation, the downlink data portions are depicted in FIG. 4 as being apportioned equal time. However depending on the bandwidth allocated to each station, by for example the network controller 124, the downlink frame may be apportioned differently between the different stations. Additionally, if one or more new stations enter into communication with the access point, the down link frame may be re-apportioned between the different stations to allocate a downlink data portion to the new stations.

An access point may receive data from one or more stations during the uplink frame 404. With reference to FIG. 1, uplink data portion 404-1 may correspond to data communicated by station 102-1 to access point 102. Similarly, uplink data portion 404-2, 404-3, 404-4 and 404-5 may correspond to data communicated by stations 102-2, 102-3, 102-4 and 102-5 to access point 102 respectively. By way of example and without limitation, the uplink data portions are depicted as being apportioned equal time. However depending on the bandwidth allocated to each station, by the network controller 124 for example, the uplink frame may be apportioned differently between the different stations. Additionally, if one or more new stations enter into communication with the access point, the uplink frame may be re-apportioned between the different stations to allocate uplink data portions to the new stations.

FIG. 4 illustrates in more detail one example of broadcast data 410 of the frame 400. Broadcast data 410 comprises PHY data 412 and 418, MAC data 414 and 416 and payload 420. The format of PHY data 412 and 418 and MAC data 414 and 416 is specified by the IEEE 802.11 protocol. PHY 318 of access point 302 may generate and insert the data corresponding to PHY data 412 and 418. MAC 322 may generate and insert MAC data 414 and 416. Payload 420 includes data that may be processed by other elements of client 304. In an exemplary embodiment, payload 420 may include data corresponding to a communication "schedule" generated by scheduler 314 (FIG. 3). The schedule may specify for example when during the corresponding uplink frame a station should communicate data to the access point and the time apportioned to each station. As an example, the schedule may specify the uplink (404-1, 404-2, 404-3, 404-4 and 404-5) and downlink slot times (402-1, 402-2, 402-3, 402-4 and 402-5) assigned to stations 102-1, 102-2, 102-3, 102-4 and 102-5 respectively. The slot times may be represented as time offsets from the synchronization events. The schedule may also specify if the uplink frame and/or downlink frame is shifted and the value of the shift. A station receiving the schedule may add the value of the specified time shift to its assigned slot time to determine its respective new downlink and/or uplink time slot.

Preamble 412-1 comprises a predetermined data pattern that receiving stations may synchronize to. For example, with reference to FIG. 3, TX/RX 332 of client 304 may detect the data pattern corresponding to preamble 412-1 by decoding preamble 412-1 and determine that a downlink frame is being transmitted by access point 304. Detecting the data pattern takes between 4 to 8 microseconds in some embodiments. Detection may take more or less time in other embodiments or with other data transmission protocols. During this time, TX/RX 332 cannot detect preambles from downlink frame transmitted by another access point. A station such as station 102-2 will fail to synchronize to a downlink frame transmitted by access point if it arrives during the 4-8 microsecond period after the downlink frame transmitted by access point 304.

Referring again to FIG. 1, in a scenario where a downlink frame transmitted by access point 106 is received by station 102-2, station 102-2 will commence decoding the preamble 412-1 of the downlink frame transmitted by access point 106. If a downlink frame transmitted by access point 102 arrives at station 102-2 during a time period 4-8 microseconds after the downlink frame transmitted by the access point 106 is received, the station 102-2 will fail to detect a downlink frame transmitted by access point 102. Referring to FIG. 4 the 4-8 microsecond time period corresponds to the time period between time 422 and 424.

Generally, if the downlink frame transmitted by access point 102 arrives after time 424, the receiver portion (TX/RX 332) of 102-2 may resynchronize to the downlink frame transmitted by access point 102. However, if the downlink frame transmitted by access point 102 arrives anytime time between 422 and 424, the receiver portion (TX/RX 332) of 102-2 may fail to resynchronize to the downlink frame transmitted by access point 102. In this scenario, station 102-2 may receive the complete downlink frame transmitted by neighboring access point 106. Because this downlink frame includes downlink data for stations 106-1, 106-2, 106-3 and 122, station 102-2 will discard the data. In other scenarios, station 102-2 may not be able to decode the transmissions from both access points 102 and 106. This results in inefficient operation and increased packet loss.

To prevent this situation, an access point such as access point 102 may shift the start of transmission of its downlink frame based on the results of the previously discussed scan of the radio frequency channel. The shift may correspond to a time that exceeds time 424. The receiver of a station such as station 102-2 may then resynchronize to the time shifted downlink frame transmitted by access point 102.

In an exemplary embodiment, payload 420 includes a data field 426 that specifies if the downlink frame is shifted and the value of the shift. If an access point such as 102 shifts the start of its downlink frame, it may update the data field 426 to indicate the value of the time shift. A neighboring access point receiving the downlink frame may identify the value of the time shift and further shift the start of its downlink frame by a sufficient value to prevent its client stations from erroneously synchronizing to downlink frame transmitted by access point 102.

Figure 5:
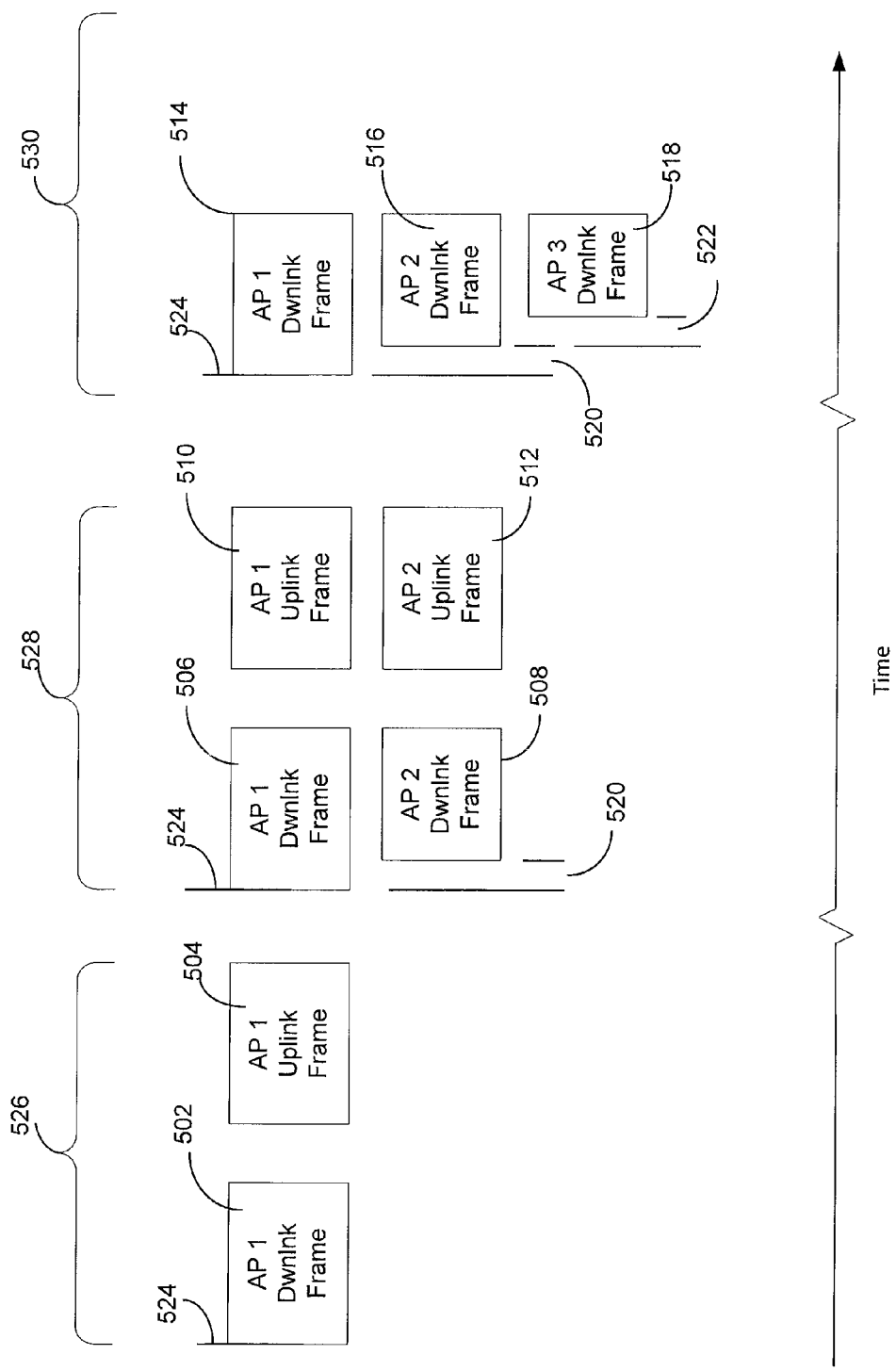
FIG. 5 is a timing diagram of TDD frames that may be communicated in the communication system of FIG. 1.

The timing diagram 500 of FIG. 5 illustrates a scenario where three neighboring access points AP1, AP2 and AP3 communicate via the same range of frequencies and have overlapping service areas. The operation of the three access points may be synchronized, for example by a GPS signal received from GPS satellites. Each access point implements the previously described scheme to shift the start time of transmission of its respective downlink frame in response to receiving downlink frames from neighboring access points. The access points are also configured to examine the payload portion of the downlink data frame to identify a time shift value (426 of FIG. 4). During a first TDD frame 526 access point AP1 in response to receiving synchronization event 524 may transmit its downlink frame 502 at a time approximately corresponding to the occurrence of synchronization event 524. Access point AP1 may set the value of its data field 426 to '0' in downlink frame 502 to indicate that its downlink frame 502 is not shifted. Access point AP 2 may receive the downlink frame 502 during a scan of the radio frequency channel. Access point AP2 may determine from the data field 426 of downlink frame 502 that the downlink frame 502 is not shifted.

During a subsequent TDD frame 528, in response to receiving synchronization event 524, access point AP2 may shift the start of its downlink frame 508 by time duration 520. Additionally, access point AP2 may update data field 426 of the payload portion 420 of broadcast data 410 of its downlink frame 508 to indicate the duration of the time shift 520. Separately access point AP1 may transmit its downlink frame 506 in in response to receiving synchronization event 524.

A third access point AP3 may receive downlink frames 506 and 508 during TDD period 528. Based on an analysis of the downlink frames, access point AP3 may determine that downlink frame 506 is not shifted and that downlink frame 508 is shifted by time duration 520. In response, AP3 may determine a time shift value for its downlink frames.

During a subsequent TDD frame 530, AP3 may transmit its downlink frame 518. Access point AP3 may shift the start of its downlink frame 518 by a time duration approximately corresponding to the sum of time duration 520 and time duration 522. Time duration 520 may substantially equal to time duration 522 and may be configured by network controller 124 (FIG. 1). Access point AP3 may update data field 426 of the payload portion 420 of broadcast data 410 of its downlink frame 518 to indicate that the duration of the time shift corresponds to time duration 520 and 522. In this example, the uplink frame 504, 510 and 512 are not shifted.

In the foregoing example, uplink frames 510 and 512 are not shifted. In other scenarios, uplink frames 510 and 512 may also be shifted by a time duration 520. In still other scenarios, uplink frames 510 and 512 may be shifted by a time duration different from time durations 520. In yet other scenarios, downlink frames 514 and 516 may not shifted. In these scenarios, downlink frame 518 may be shifted by a time duration 520 from the synchronization event 524.

Figure 6:
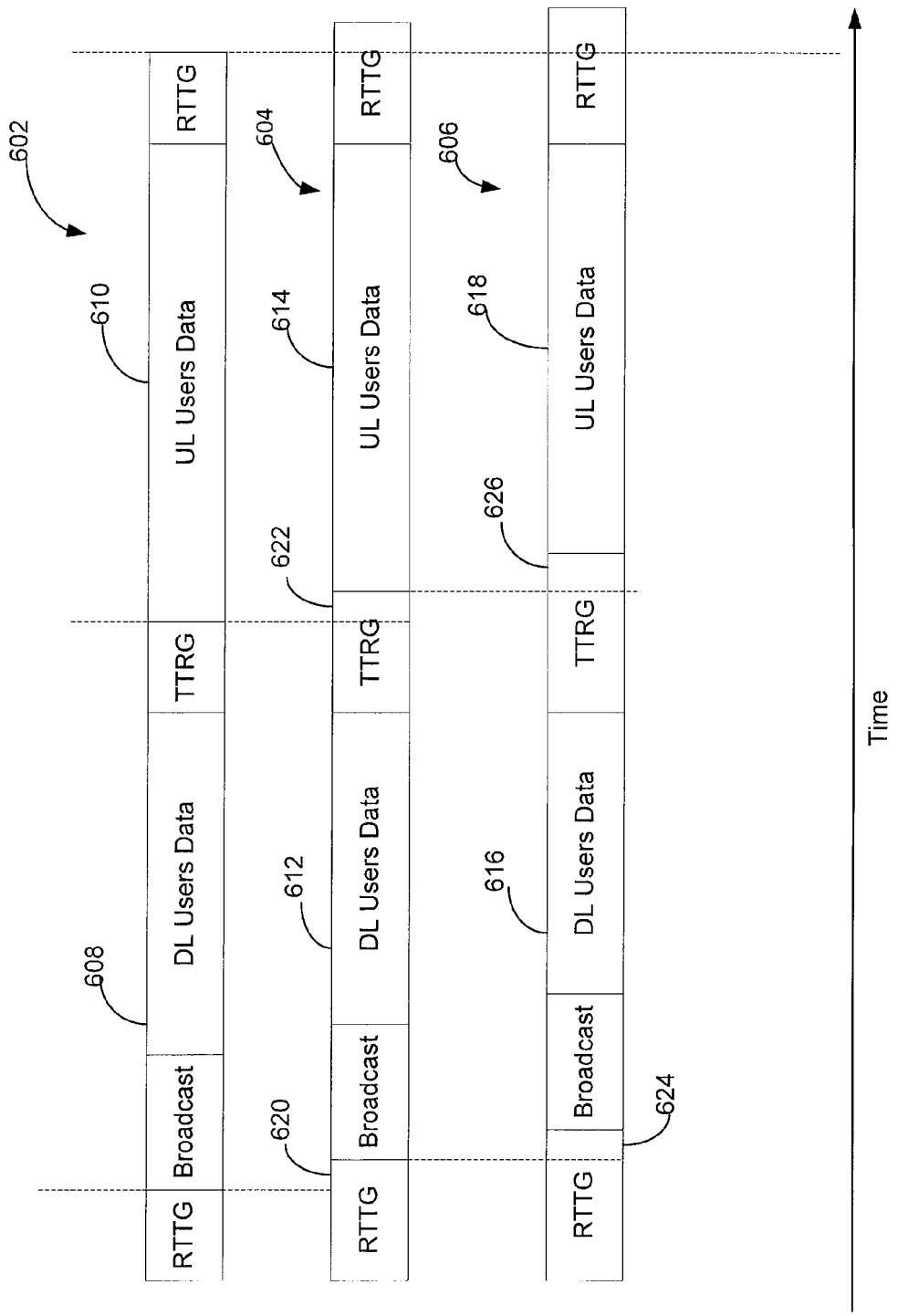
FIG. 6 is another timing diagram illustrating communication of TDD frames by wireless devices of communication system of FIG. 1.

FIG. 6 illustrates communication of example TDD frames 602 604 and 606 via a radio frequency communication channel 600. The communication of the TDD frames 602, 604 and 606 is synchronized to a periodic synchronization event. Frames 602, 604 and 606 may correspond to TDD frames communicated between access points 102, 104 and 106 and their respective stations, respectively.

In this example, access point 102 causes transmission of downlink frame 608 of TDD frame 602 at a time corresponding to the reception of a synchronization event. Access point 102 may communicate data to stations 102-1, 102-2, 102-3, 102-4 and 102-5 downlink frame 608. Some or all of stations 102-1, 102-2, 102-3, 102-4 and 102-5 may communicate data to access point 102 during uplink frame 610.

Access point 104 shifts the start of transmission of downlink frame 612 by a time interval 620. In this example, the schedule generated by scheduler 314 (FIG. 3) of access point 104 may instruct stations 104-1, 104-2 and 120 to shift their respective uplink data slots by a value corresponding to a time interval 622. Depending on characteristics of hardware, time interval 622 may be configured to be different from time interval 620.

Similarly, access point 106 shifts the start of transmission of downlink frame 616 by a time 624. The time 624 may correspond to an integer multiple of time 620. As previously discussed with respect to FIG. 5, access point 106 may determine time 620 by analyzing the payload 420 of previously received TDD frame transmitted by access point 102 and 104. Access point 106 may also instruct stations 106-1, 106-2, 106-3 and 122 to shift their respective uplink data slots by a value corresponding to time 626.

Figure 7:
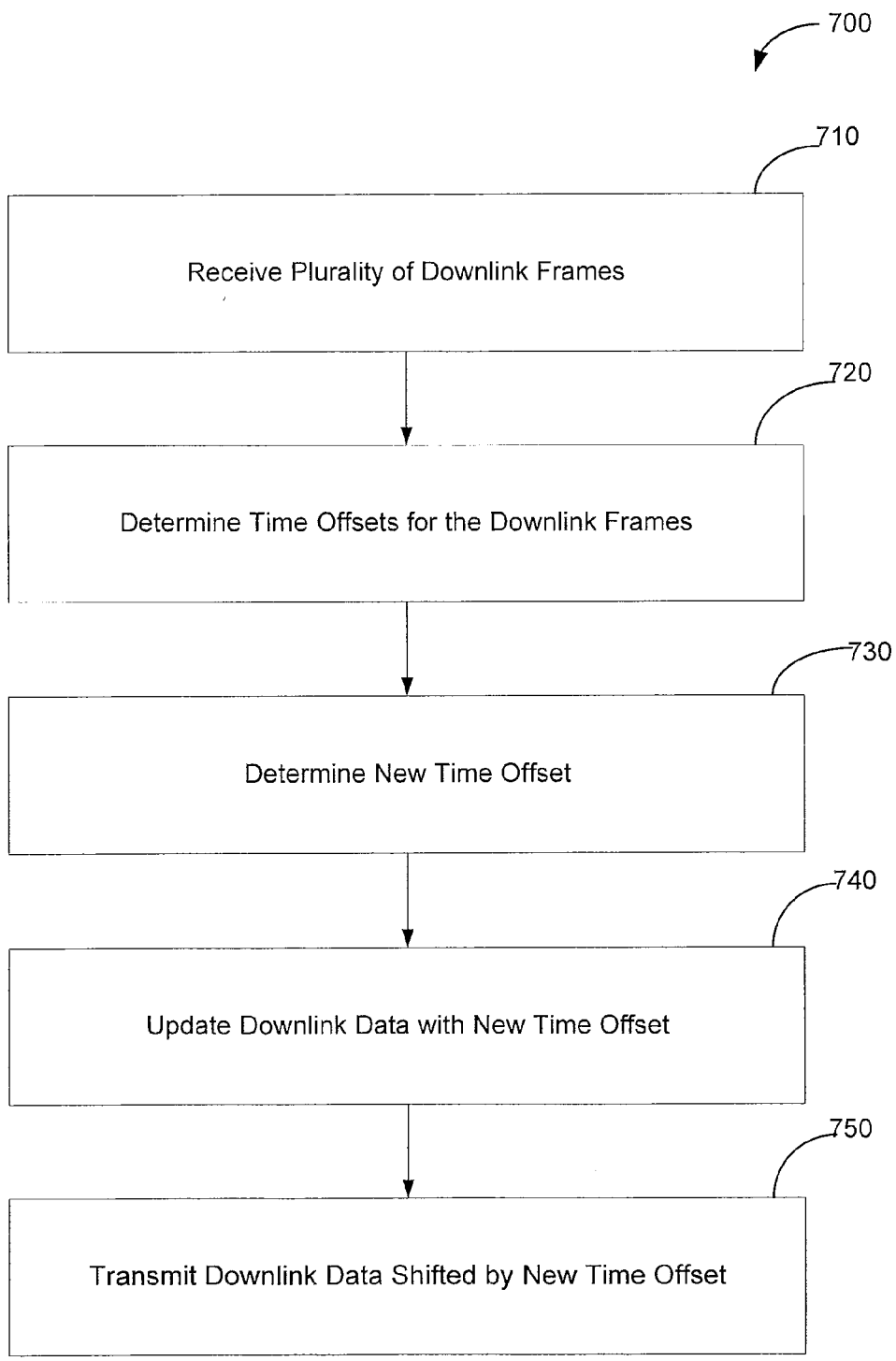
FIG. 7 is a flow diagram of an example method that may be implemented at an access point.

FIG. 7 is a flow diagram of an example method 700 that may be implemented in an access point such access point 102 of FIG. 1. In some embodiments, method 700 may be implemented as software instructions that host 306 of FIG. 3 may execute. Some or all of the functionality associated with method 700 may be implemented by scheduler 314, in an embodiment.

At block 710, access point 302 may receive one or more downlink frames transmitted by neighboring access points. In an embodiment, receiver TX/RX 320 may be configured to receive frames during both downlink and uplink frame periods of a TDD frame.

At block 720, access point 302 may determine if one or more of the received downlink frames are shifted from the start of the downlink frame period during which they were received. As previously discussed, the payload 420 (FIG. 4) of each of the downlink frames may include data in a data field 426 that indicates the value of the time shift or time offset of the corresponding downlink frame.

At block 730, a new time offset may be determined for downlink frames that are to be transmitted by access point 302. In an embodiment, the time offsets determined at block 720 may be summed at block 730. In this embodiment, to determine the new time offset, a time offset value may be added to the resulting sum. The time offset value selected is greater than the previously discussed time period of the small window of time.

In another embodiment, at block 730, an access point may determine a time offset value that is between the values of the time offsets determined for two received downlink frames. For example, at block 730, the access point may determine that the first received downlink frame has a time offset value of 3 microseconds and the second received downlink frame has a time offset value of 23 microseconds. In response, the access point may select a new time offset value of 13 microseconds At block 740, access point 302 may update data field 426 of its downlink data with the new time offset value. Separately, at block 740, scheduler 314 may generate a downlink and uplink schedule based on the new time offset value. Broadcast data 410 of downlink frame may be updated with the schedule.

At block 750, in response to receiving a synchronization event, scheduler 314 may cause the transmission of the downlink frame shifted in time by the new time offset value. In an embodiment, scheduler 314 may instantiate a timer with an expiration time corresponding to the value of the new time offset, for example 13 microseconds. Upon expiration of the time, the downlink frame may be transmitted via antenna 316.

In an alternative embodiment, determination of the time shifts may be centralized in network controller 124 of FIG. 1. In this embodiment network controller 124 may determine the value of the time offsets 620, 624, 622 and 626. In this embodiment, network controller 124 may instruct access point 102 to scan the radio frequency communication channel. Network controller 124 may receive the results of the scan via network 110.

The results of the scan may include information corresponding to downlink frames transmitted by access point 104, 106 and 108 and received by access point 102. Based on the results of the scan network controller 124 may determine values of time offsets 620, 624, 622 and 626. Network controller 124 may communicate the time offsets to the corresponding access points. If new access points are added to the communication system 100, network controller 124 may determine different values of time offsets.

Each of the methods described herein may be encoded in a computer-readable storage medium (e.g., a computer memory), programmed within a device (e.g., one or more circuits or processors), or may be processed by a controller or a computer. If the processes are performed by software, the software may reside in a local or distributed memory resident to or interfaced to a storage device, a communication interface, or non-volatile or volatile memory in communication with a transmitter. The memory may include an ordered listing of executable instructions for implementing logic. Logic or any system element described may be implemented through optic circuitry, digital circuitry, through source code, through analog circuitry, or through an analog source, such as through an electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable storage medium," "machine-readable medium," "propagated-signal" medium, and/or "signal-bearing medium" may comprise a medium (e.g., a non-transitory medium) that stores, communicates, propagates, or transports software or data for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection having one or more wires, a portable magnetic or optical disk, a volatile memory, such as a Random Access Memory (RAM), a Read-Only Memory (ROM), an Erasable Programmable Read-Only Memory (EPROM or Flash memory), or an optical fiber. A machine-readable medium may also include a tangible medium, as the software may be electronically stored as an image or in another format (e.g., through an optical scan), then compiled, and/or interpreted or otherwise processed. The processed medium may then be stored in a computer and/or machine memory.

The invention claimed is:

1. A method of transmitting data, the method comprising:
receiving data at a wireless access point during a first transmission window via a radio frequency channel;
determining if the received data is aligned with a start of the first transmission window;
causing transmission of transmission data via the radio frequency channel during a second transmission window wherein the transmission of the transmission data is shifted in time from a start of the second transmission window if the received data is aligned with the start of the first transmission window,
wherein the first transmission window corresponds to a downlink frame of a first TDD frame and the second transmission window corresponds to a downlink frame of a second TDD frame.

2. The method of claim 1 further comprising updating a data field in the transmission data with a value corresponding to the shift from the start of the second transmission window.

3. The method of claim 1 wherein, if a signal strength of radio signals corresponding to the received data is below a threshold, causing transmission of the transmission data aligned with the start of the second transmission window.

4. The method of claim 3 further comprising, in response to determining that the received data is shifted from the start of the first transmission window, causing transmission of transmission data during the second transmission window wherein the transmission of the data is aligned with the start of the second transmission window.

5. The method of claim 4 wherein determining if the received data is shifted comprises identifying a shift value from the received data.

6. The method of claim 5 further comprising causing the transmission of the transmission data during the second transmission window wherein the transmission of the transmission data is shifted from the start of the second transmission window by a time value determined from the identified shift value.

7. The method of claim 6 wherein the start of the first transmission window and the start of the second transmission window corresponds to a respective synchronization event.

8. The method of claim 1 further comprising transmitting the transmission data via the radio frequency channel by an access point.

9. The method of claim 1 wherein the received data is formatted in accordance with an 802.11 protocol.

10. A wireless access point comprising:
a network interface comprising a receiver and a transmitter, the receiver operable to receive data via a radio frequency channel and the transmitter operable to transmit transmission data via the radio frequency channel;

a scheduler in data communication with the network interface, the scheduler operable to (i) determine if the received data during a first transmission window is aligned with a start of the first transmission window and (ii) based on determining that the received data is aligned with the start of the first transmission window determining a time offset from a start of a second transmission window where the time offset corresponds to a time to transmit the transmission data during the second transmission window, wherein the first transmission window corresponds to a downlink frame of a first TDD frame and the second transmission window corresponds to a downlink frame of a second TDD frame.

11. The wireless access point of claim 10, further comprising a GPS receiver, the GPS receiver operable to generate a synchronization event.

12. The wireless access point of claim 11 wherein the scheduler is adapted to receive the synchronization event and based on the time offset to cause the transmission of transmission data shifted from the start of the second transmission window by the time offset.

13. The wireless access point of claim 11 wherein the scheduler is adapted to receive the synchronization event and cause the transmission of data aligned with the start of the second transmission window if a signal strength of radio signals corresponding to the received data is below a threshold.

14. The wireless access point of claim 11 wherein the scheduler is configured to update a data field in the data with a value corresponding to the time offset.

15. The wireless access point of claim 11, wherein the scheduler is adapted to receive the synchronization event and based on determining that the received data is shifted from the start of the first transmission window cause the transmission of data aligned with the start of the second transmission window.

* * * * *